(12) United States Patent
Hession

(10) Patent No.: US 12,279,556 B2
(45) Date of Patent: Apr. 22, 2025

(54) DUAL VARIABLE FEEDER DRIVE FOR AGRICULTURAL VEHICLE

(71) Applicant: CNH Industrial America LLC, New Holland, PA (US)

(72) Inventor: Adam L. Hession, Davenport, IA (US)

(73) Assignee: CNH Industrial America LLC, New Holland, PA (US)

( * ) Notice: Subject to any disclaimer, the term of this patent is extended or adjusted under 35 U.S.C. 154(b) by 800 days.

(21) Appl. No.: 17/385,267

(22) Filed: Jul. 26, 2021

(65) Prior Publication Data

US 2023/0024497 A1 Jan. 26, 2023

(51) Int. Cl.
*A01D 45/02* (2006.01)
*A01D 41/14* (2006.01)
*A01D 69/00* (2006.01)
*A01D 69/06* (2006.01)

(52) U.S. Cl.
CPC ......... *A01D 41/142* (2013.01); *A01D 45/021* (2013.01); *A01D 69/002* (2013.01); *A01D 69/06* (2013.01)

(58) Field of Classification Search
CPC .... A01D 45/02–45/028; A01D 43/08–43/088; A01D 41/142; A01D 69/00–69/12; A01D 34/8355; A01D 45/025; A01D 69/002; A01D 45/021; A01D 41/16
See application file for complete search history.

(56) References Cited

U.S. PATENT DOCUMENTS

| | | | |
|---|---|---|---|
| 5,921,070 A | 7/1999 | Chamberlain | |
| 6,726,560 B2 | 4/2004 | Ho et al. | |
| 7,234,291 B2 * | 6/2007 | Rickert | A01D 41/142 56/12.6 |
| 7,749,055 B2 | 7/2010 | Ricketts | |
| 7,867,071 B1 | 1/2011 | Ricketts et al. | |
| 8,534,036 B2 | 9/2013 | Zegota et al. | |
| 9,198,352 B2 * | 12/2015 | Tilly | A01D 45/021 |
| 9,578,804 B2 * | 2/2017 | Gessel | A01D 45/021 |
| 9,913,430 B2 * | 3/2018 | Cook | A01D 45/021 |
| 10,327,386 B2 * | 6/2019 | Gessel | A01D 45/025 |
| 10,602,666 B2 | 3/2020 | Ricketts | |
| 10,694,671 B2 * | 6/2020 | Terryn | A01D 69/08 |

(Continued)

FOREIGN PATENT DOCUMENTS

| | | |
|---|---|---|
| CN | 205378551 U | 7/2016 |
| CN | 208175384 U | 12/2018 |

(Continued)

OTHER PUBLICATIONS

International Search and Written Opinion for Application No. PCT/US2022/037858 dated Nov. 4, 2022 (12 pages).

*Primary Examiner* — Adam J Behrens
*Assistant Examiner* — Madeline I Runco
(74) *Attorney, Agent, or Firm* — Peter K. Zacharias; Rebecca L. Henkel; Rickard K. DeMille

(57) ABSTRACT

An agricultural vehicle includes a feederhouse having a first output shaft that is configured to be connected to a header, and a second output shaft that is also configured to be connected to the header. The first and second output shafts are configured to be operated at different rotational speeds on the feederhouse for driving different header drives on the header at different speeds.

10 Claims, 2 Drawing Sheets

(56) References Cited

U.S. PATENT DOCUMENTS

| | | | |
|---|---|---|---|
| 2014/0020355 A1* | 1/2014 | Tilly .................... | A01D 45/021 |
| | | | 56/103 |
| 2015/0257337 A1* | 9/2015 | Schrattenecker .... | A01D 45/028 |
| | | | 56/60 |
| 2015/0305240 A1* | 10/2015 | Gessel ................. | A01D 45/025 |
| | | | 56/52 |
| 2016/0073585 A1* | 3/2016 | Cook .................... | A01D 69/06 |
| | | | 56/10.8 |
| 2017/0118916 A1* | 5/2017 | Gessel ................. | A01D 45/023 |
| 2019/0090418 A1 | 3/2019 | Cook | |
| 2019/0133039 A1 | 5/2019 | Bryant et al. | |

FOREIGN PATENT DOCUMENTS

| | | | |
|---|---|---|---|
| EP | 2936963 A1 | 10/2015 | |
| EP | 2995188 A1 | 3/2016 | |
| EP | 3150054 A1 | 4/2017 | |

\* cited by examiner

DUAL VARIABLE FEEDER DRIVE FOR AGRICULTURAL VEHICLE

FIELD OF THE INVENTION

The present invention relates to agricultural vehicles. More specifically, the present invention relates to a dual variable feeder drive for an agricultural vehicle, such as a combine harvester.

BACKGROUND OF THE INVENTION

As is described in U.S. Pat. No. 10,602,666 to CNH America LLC (the '666 patent), which is incorporated by reference in its entirety and for all purposes, an agricultural harvester known as a "combine" is historically termed such because it combines multiple harvesting functions with a single harvesting unit, such as picking, threshing, separating, and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. The threshing rotor is provided with rasp bars that interact with the crop matter in order to further separate the grain from the crop matter, and to provide positive crop movement. Once the grain is threshed, the grain is cleaned using a cleaning system. The cleaning system includes a cleaning fan which blows air through oscillating sieves to discharge chaff and other debris toward the rear of the combine. Non-grain crop material, such as straw, from the threshing section proceeds through a straw chopper and out the rear of the combine. Clean grain is transported to a grain tank onboard the combine.

A corn header, which is attachable to the feeder of the combine, generally includes a conveyor, row units, and accompanying drive architecture to power the header. The conveyor is disposed aft of the row units and it may be in the form of a conveyor belt, an auger with a tubular shaft having left and right flighting, or a combination of both. The row units generally include snouts, gathering chains, and stalk rolls. The snouts are conically shaped to pass in between the rows of corn, defining a designated passageway in between the snouts for the rows of corn to travel therein. Each row unit also includes respective gear boxes to drive the gathering chains and stalk rolls. Generally, the respective gear boxes are all driven by a single rotating cross shaft, which in turn is operably driven by the power take off (PTO) shaft of the agricultural vehicle. The PTO shaft is located on the feeder of the vehicle and has two ends, each of which is connected to respective shafts on the header for powering said gear boxes.

As is described in U.S. Pat. No. 8,534,036 (the '036 patent), which is also incorporated by reference in its entirety and for all purposes, a corn header has at least two feed and snapping units (i.e., row units) which are driven by a drive shaft at the same operating speed, and each of which is equipped with a snapping gap and an intake conveyor mechanism which draws the plants into the snapping gap which is used to separate crops from the plants. The corn header also has a chopping device for fragmentizing the stalks of the plants, which is disposed downstream of the particular intake conveyor mechanism. The chopping unit has a drive which can be used to adapt the drive speed of the chopping unit when the operating speed of the row unit changes. The corn header includes internal gear boxes for driving the chopping units at a different speed than the row units, as required. The chopping units and row units receive power from the same PTO shaft on the combine feeder.

Described herein are two variable speed PTO shafts on the combine feeder. In general, the PTO shafts may be used for independently driving two components on a header (for example) at different speeds. For example, the PTO shafts may be used for independently driving the row units and chopping units at different speeds. As another example, the two PTO shafts may be used for powering the lateral belts and sickle bar on a draper header. Including two variable speed PTO shafts on the combine feeder reduces complexities and requirements for gear boxes in the headers.

SUMMARY OF THE INVENTION

According to one aspect of the invention, an agricultural vehicle includes a feederhouse having a first output shaft that is configured to be releasably connected to a header, and a second output shaft that is also configured to be releasably connected to the header. The first and second output shafts are configured to be operated at different rotational speeds on the feederhouse for driving different header drives on the header at different speeds.

According to another aspect of the invention, a method of operating a feederhouse of an agricultural vehicle, said method comprises: rotating a first output shaft on the feederhouse at a first speed; and rotating a second output shaft on the feederhouse at a second speed that is different from the first speed.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

DETAILED DESCRIPTION OF THE INVENTION

Figure 1:
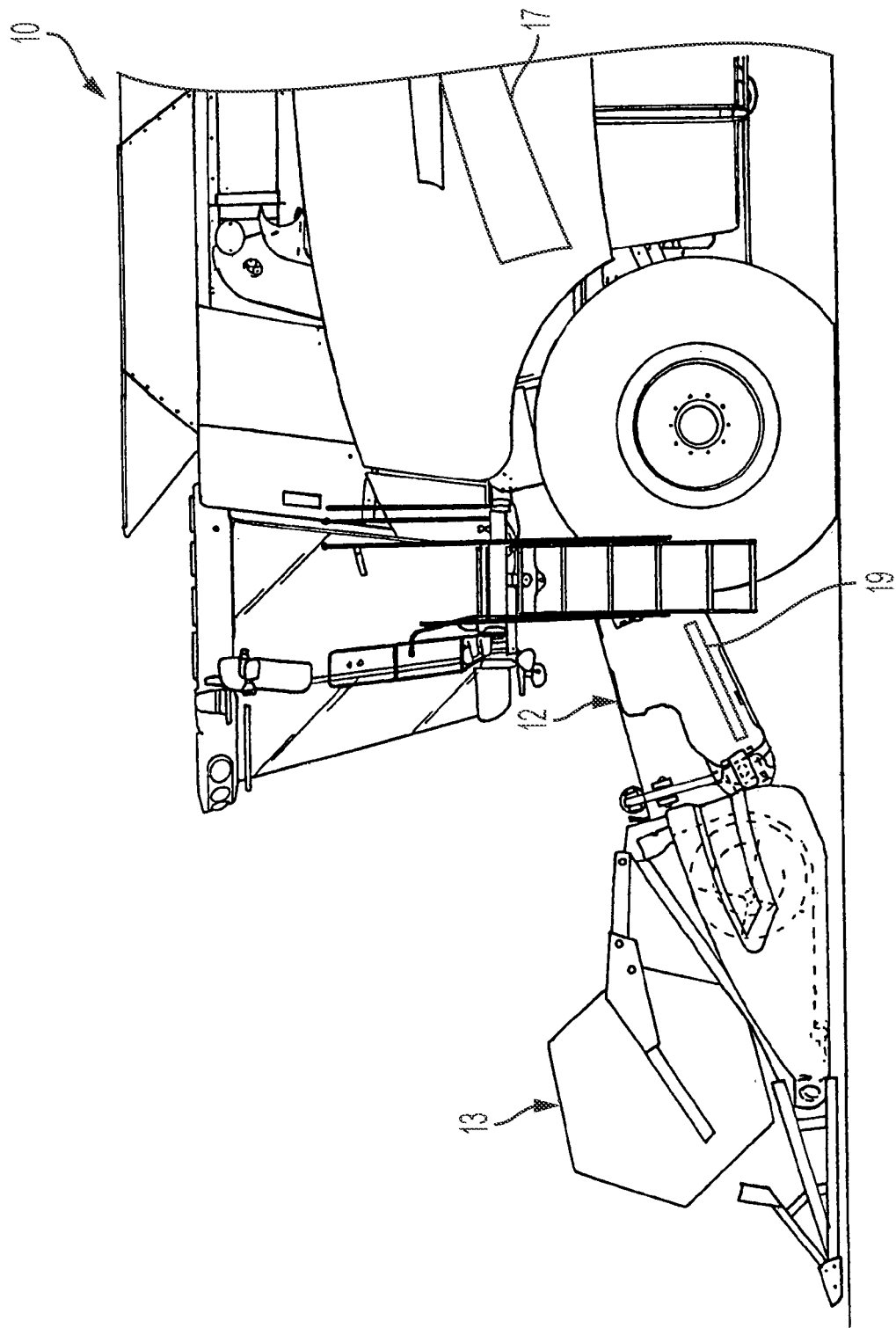
FIG. 1 is a side view of a combine harvester including a feeder and a header mounted to the feeder.

Corresponding reference characters indicate corresponding parts throughout the several views. The exemplification set out herein illustrates an embodiment of the invention, in one form, and such exemplification is not to be construed as limiting the scope of the invention in any manner.

Inasmuch as various components and features of harvesters are of well-known design, construction, and operation to those skilled in the art, the details of such components and their operations will not generally be discussed in significant detail unless considered of pertinence to the present invention or desirable for purposes of better understanding.

In the drawings, like numerals refer to like items, certain elements and features may be labeled or marked on a representative basis without each like element or feature necessarily being individually shown, labeled, or marked, and certain elements are labeled and marked in only some, but not all, of the drawing figures.

Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 2:
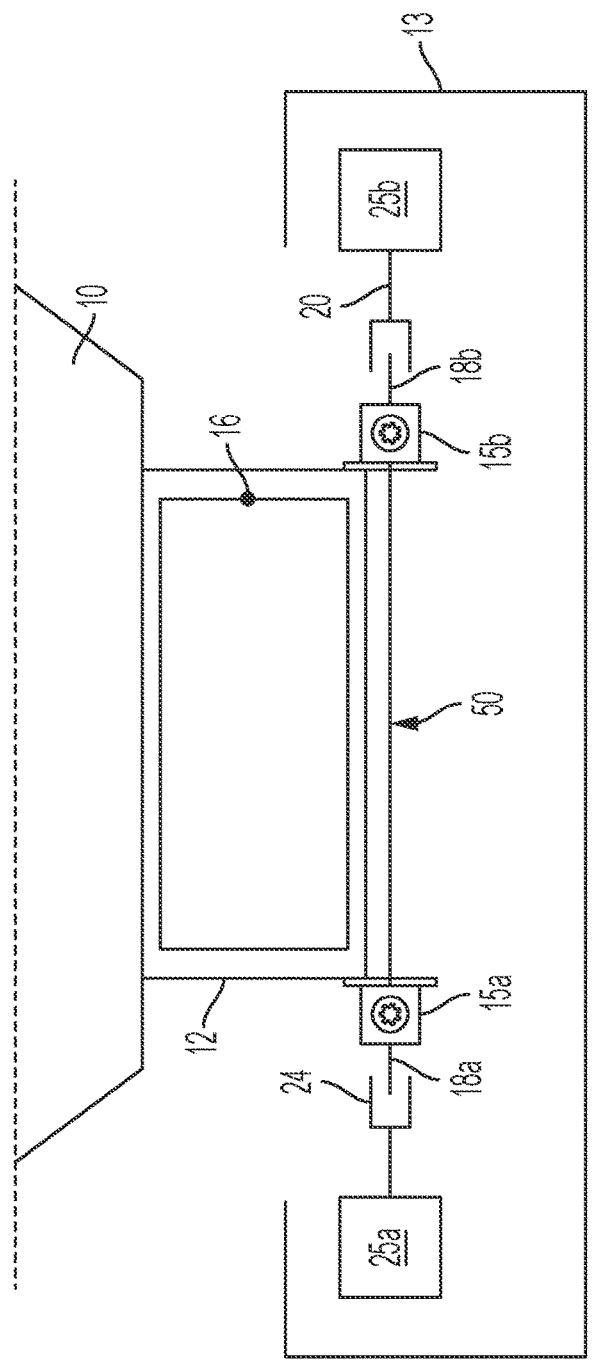
FIG. 2 is front elevation view of the combine of FIG. 1 shown schematically depicting the feeder drives connected to the header drives.

Referring now to the drawings, and more particularly to FIGS. 1 and 2, in accordance with the present invention, a header 13 is removably connected to a feeder 12 of a combine harvester 10.

Feeder 12 (also referred to herein as a feederhouse) comprises an inlet opening 16 through which crop material is received from header 13 and an outlet opening through which crop material is distributed to a threshing system 17 (shown schematically) of harvester 10. Feeder 12 also includes a conveyor system 19 for conveying crop from the inlet opening 16 to the outlet opening.

Power generated by the engine of the combine (for example) is transferred via a gear and/or belt arrangement to a transverse shaft 50 in the feeder 12. One end of shaft 50 is connected to a first gearbox 15a, and the opposite end of shaft 50 is connected to a second gearbox 15b. The gearboxes 15a and 15b (referred to collectively or individually as gearboxes 15) may also be referred to herein as a transmission and may include a clutch and a set of gears, for example. The gearboxes 15 provide controlled application of power, and are configured to operate at different gear ratios and have the capability to switch between the different gear ratios. This switching may be accomplished automatically by a control unit or manually by the operator of the combine. Each gearbox 15a and 15b can convert the input torque from the shaft 50 to achieve a desired speed at the output shaft 18a and 18b of the gearbox 15, respectively. Importantly, the gearboxes 15a and 15b are variable speed units that are configured to be operated at different output speeds/torques (if so desired), such that gearbox 15a can spin output shaft 18a at a first speed while the second gearbox 15b can spin output shaft 18b at a second speed that differs from the first speed. Output shafts 18a and 18b may be referred to herein as feeder jackshafts.

Although gearbox 15 is described as a mechanical transmission unit, it should be understood that each gearbox 15 may represent an electrically powered unit or a hydraulically powered unit, for example, that is capable of being operated at variable speeds.

The output shafts 18a and 18b are removably and non-rotatably connected to header drives 25a and 25b by releasable connections 24 and 20, respectively, on header 13. Rotation of output shaft 18a causes rotation of header drive 25a, and rotation of output shaft 18b causes rotation of header drive 25b. Header drives 25a and 25b may be operated at different speeds depending upon the rotational speed of the output shaft 18a and 18b that is connected thereto. Header drives 25 and 25b may also be referred to herein as header jackshafts.

Figure 3:
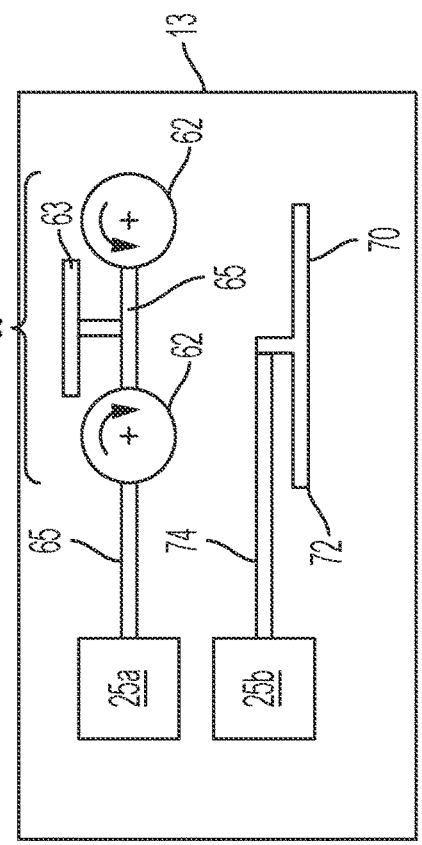
FIG. 3 is a schematic illustration of a corn header including header drives that are independently connected to a row unit and a chopping unit of the header.

Header 13 is, optionally, a corn header. Further details of a corn header are disclosed in U.S. Pat. Nos. 7,749,055; 8,534,036 and 7,867,071, which are each incorporated by reference in their entirety and for all purposes. Turning now to FIG. 3, header drive 25a is connected to a row unit 60 comprising two opposing snapping rollers 62, a conveyor chain 63 positioned above rollers 62, and a mechanism 65 interconnecting rollers 62 and conveyor chain 63. Mechanism 65, which is shown schematically in FIG. 3 comprises gears, shafts, chains and/or pulleys for transferring motion from header drive 25a to row unit 60. Row units 60 are known in the art. Row unit 60 is shown for exemplary purposes and is not limited that which is shown. Header drive 25a, which is powered by feeder drive 15a, imparts motion to the components of row unit 60 for moving those components at a first speed (which may be a linear speed or rotational speed).

Header drive 25b is connected to a chopping unit 70 comprising a moveable (e.g., rotating) knife 72. Mechanism 74, which is shown schematically in FIG. 3 comprises gears, shafts, chains and/or pulleys for transferring motion from header drive 25b to knife 72. Chopping units 70 are known in the art. Chopping unit 70 is shown for exemplary purposes and is not limited that which is shown. Header drive 25b, which is powered by feeder drive 15b, imparts motion to the components of chopping unit 70 for moving knife 72 at a second speed (which may be a linear speed or rotational speed) that differs from the aforementioned first speed of the row unit.

Chopping unit 70 is associated with and positioned beneath row unit 60 to form a unit pair of corn header 13. It should be understood that although only one unit pair is shown, header 13 includes a plurality of unit pairs. Multiple chopping units 70 are connected to and powered by header drive 25b, and, similarly, multiple row units 60 are connected to and powered by header drive 25a. In operation, conveyor chain 63 moves the corn stalk into the space between rollers 62, rollers 62 shear the ear of corn from the stalk and delivers the ear of corn into the feeder 12, and knife 72 shears the stalk.

As noted in the background section, the feeder drives 15a and 15b may be used for independently driving two components on a header (for example) at different speeds. For example, feeder drives 15a and 15b may be used for independently driving the row units and chopping units at different speeds, as was described above. As another example, feeder drives 15a and 15b may be used for independently powering the lateral belts and sickle bar on a draper header. Including two variable speed PTO shafts on the combine feeder (as opposed to the header) reduces complexities and requirements for gear boxes in the headers.

While this invention has been described with respect to at least one embodiment, the present invention can be further modified within the spirit and scope of this disclosure. As an example, this invention may be applicable to combines, self-propelled wind rowers, and forage harvester feeders. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural vehicle comprising:
  a feederhouse that is configured to be releasably connected to a header of the agricultural vehicle, the feederhouse including (i) a housing, (ii) a first gearbox that is mounted to one side of the housing and has a first output shaft that is configured to be releasably connected to the header, and (iii) a second gearbox that is mounted to an opposing side of the housing and has a second output shaft that is also configured to be releasably connected to the header, wherein the first and second gearboxes are connected to a common shaft on the feederhouse, wherein the first and second output shafts are configured to be operated at different rotational speeds on the feederhouse while the feederhouse is disconnected from the header.

2. The agricultural vehicle of claim 1, wherein the housing of the feederhouse comprises an inlet opening through which crop material is received from the header and an outlet opening through which crop material is distributed to a threshing system of the agricultural vehicle.

3. The agricultural vehicle of claim 2, wherein the feederhouse comprises a conveyor system for conveying crop from the inlet opening to the outlet opening.

4. The agricultural vehicle of claim 1, further comprising the header, wherein the header includes a first header drive that is releasably connected to the first output shaft, and a second header drive that is releasably connected to the second output shaft.

5. The agricultural vehicle of claim 4, wherein the header is a corn header, and the first header drive is connected to a row unit of the header, and the second header drive is connected to a chopping unit of the header.

6. The agricultural vehicle of claim 5, wherein the chopping unit includes a knife.

7. The agricultural vehicle of claim 1, wherein the first and second output shafts are non-removably connected to the feederhouse.

8. A method of operating a feederhouse of an agricultural vehicle, wherein the feederhouse is configured to be releasably connected to a header of the agricultural vehicle, said method comprising:
rotating a first output shaft of a first gearbox, which is disposed on one side of the feederhouse and configured to be releasably connected to the header, at a first speed while the feederhouse is disconnected from the header; and
rotating a second output shaft of a second gearbox, which is disposed on another side of the feederhouse and configured to be releasably connected to the header, at a second speed that is different from the first speed while the feederhouse is disconnected from the header, wherein the first and second output shafts are connected to a common shaft on the feederhouse.

9. The method of claim 8 further comprising connecting the first output shaft to a first header drive of the header of the agricultural vehicle, and connecting the second output shaft to a second header drive of the header, and operating the first and second header drives at different speeds.

10. The method of claim 9, wherein the header is a corn header, the first header drive is connected to a row unit of the header, and the second header drive is connected to a chopping unit of the header, and the row units and chopping units are operated at different speeds by virtue of the speeds of the first and second output shafts.

* * * * *